(12) United States Patent
Kuboyama et al.

(10) Patent No.: US 8,049,778 B2
(45) Date of Patent: Nov. 1, 2011

(54) PARKING ASSISTANCE DEVICE (75) Inventors: Tsuyoshi Kuboyama, Kariya (JP); Kazuya Watanabe, Anjo (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 12/531,391

(22) PCT Filed: May 20, 2008

(86) PCT No.: PCT/JP2008/059225
§ 371 (c)(1), (2), (4) Date: Sep. 15, 2009

(87) PCT Pub. No.: WO2008/149664
PCT Pub. Date: Dec. 11, 2008

(65) Prior Publication Data
US 2010/0066825 A1    Mar. 18, 2010

(30) Foreign Application Priority Data
May 30, 2007    (JP) .................... 2007-143836

(51) Int. Cl.
*H04N 7/00*   (2011.01)
*H04N 7/18*   (2006.01)
(52) U.S. Cl. ............................... 348/118; 348/148
(58) Field of Classification Search .............. 348/118
See application file for complete search history.

(56) References Cited

U.S. PATENT DOCUMENTS

| | | | |
|---|---|---|---|
| 6,476,730 B2 * | 11/2002 | Kakinami et al. | 340/932.2 |
| 6,593,960 B1 * | 7/2003 | Sugimoto et al. | 348/148 |
| 6,611,744 B1 | 8/2003 | Shimazaki et al. | |
| 6,654,670 B2 * | 11/2003 | Kakinami et al. | 701/1 |
| 6,898,495 B2 * | 5/2005 | Tanaka et al. | 701/36 |
| 6,940,423 B2 | 9/2005 | Takagi et al. | |
| 6,950,035 B2 * | 9/2005 | Tanaka et al. | 340/932.2 |
| 7,053,794 B2 | 5/2006 | Tanaka et al. | |
| 7,069,128 B2 * | 6/2006 | Iwama | 701/36 |

(Continued)

FOREIGN PATENT DOCUMENTS

EP    1 123 844 A1    8/2001

(Continued)

OTHER PUBLICATIONS

International Search Report of PCT/JP2008/059225 dated Aug. 12, 2008.

(Continued)

*Primary Examiner* — Mehrdad Dastouri
*Assistant Examiner* — Jeremaiah Hallenbeck-Huber
(74) *Attorney, Agent, or Firm* — Sughrue Mion, PLLC (57) ABSTRACT

An imaging device mounted on a vehicle (30) acquires image data resulting from capturing an image of a scene around the vehicle (30). A parking section (E) corresponding to the desired parking position is set. The image data is subjected to an image-converting process that includes at least one of viewpoint conversion and distortion correction. A deflection angle (λ) between the vehicle (30) and the parking section (E) is calculated. The image data is outputted until the deflection angle (λ) becomes equal to or less than a predetermined reference deflection angle, the image data being outputted to a display adapted for installation in the vehicle (30). Once the deflection angle (λ) has become equal to or less than the reference deflection angle, converted image data that has been subjected to the image-converting process is outputted.

12 Claims, 9 Drawing Sheets

U.S. PATENT DOCUMENTS

| | | | |
|---|---|---|---|
| 7,161,616 B1 * | 1/2007 | Okamoto et al. | 348/148 |
| 7,272,477 B2 * | 9/2007 | Oki et al. | 701/36 |
| 7,295,227 B1 * | 11/2007 | Asahi et al. | 348/118 |
| 7,369,041 B2 * | 5/2008 | Nakanishi et al. | 340/435 |
| 7,515,067 B2 | 4/2009 | Uemura | |
| 7,599,771 B2 | 10/2009 | Mizusawa | |
| 7,755,511 B2 * | 7/2010 | Yamamoto et al. | 340/932.2 |
| 2002/0104700 A1 | 8/2002 | Shimazaki et al. | |
| 2003/0080877 A1 | 5/2003 | Takagi et al. | |
| 2003/0151526 A1 | 8/2003 | Tanaka et al. | |
| 2007/0112490 A1 | 5/2007 | Mizusawa | |
| 2007/0239357 A1 * | 10/2007 | Mori et al. | 701/213 |
| 2008/0079607 A1 | 4/2008 | Uemura | |

FOREIGN PATENT DOCUMENTS

| | | | |
|---|---|---|---|
| EP | 1 215 089 EP | 6/2002 | |
| EP | 1308346 A2 | 5/2003 | |
| EP | 1 327 571 A1 | 7/2003 | |
| EP | 1 707 474 A1 | 10/2006 | |
| EP | 1 743 808 A1 | 1/2007 | |
| EP | 1 785 336 A2 | 5/2007 | |
| JP | 3107088 B1 | 11/2000 | |
| JP | 2001-055099 A | 2/2001 | |
| JP | 2001-071842 A | 3/2001 | |
| JP | 2001-322520 A | 11/2001 | |
| JP | 3395725 B2 | 4/2003 | |
| JP | 2003137051 A | 5/2003 | |
| JP | 2003-205807 A | 7/2003 | |
| JP | 3436237 B2 | 8/2003 | |
| JP | 2003-267171 A | 9/2003 | |
| JP | 2003267171 A | * | 9/2003 |
| JP | 2004-254219 A | 9/2004 | |
| JP | 3729786 B2 | 12/2005 | |
| JP | 2006-272990 A | 10/2006 | |
| WO | 01/12472 A1 | 2/2001 | |
| WO | 2005/108171 A1 | 11/2005 | |
| WO | WO 2006100892 A1 * | 9/2006 | |

OTHER PUBLICATIONS

Korean Office Action dated Aug. 16, 2011, issued in corresponding Korean Patent Application No. 10-2009-7018889.

* cited by examiner

PARKING ASSISTANCE DEVICE

TECHNICAL FIELD

The present invention relates to a parking assistance device for assisting a driving operation involving turning for parking a vehicle in a desired parking position.

BACKGROUND ART

In recent years, awareness of safety while driving vehicles has improved, and a variety of technologies for facilitating the driving operations or the like and thereby improving safety have been proposed and put into practice. Parking assistance devices have been implemented in which, e.g., locations that are difficult for the driver to see are imaged by a camera mounted on the vehicle and are displayed on a monitor device within the vehicle cabin. A device for monitoring the rear of a vehicle, in which an actual image of the rear of a self vehicle captured by a camera is shown on a display, is disclosed in Patent Document 1, the reference for which is given below. This device switches the displayed image from an actual image to a converted image as the distance from the current position of the self vehicle to the target position decreases. The converted images are also sequentially switched from converted images having a low viewpoint to converted images having a high viewpoint.

[Patent Document 1] Japanese Laid-open Patent Application No. 2003-267171 (e.g., the 9th through 20th paragraphs, the 34th paragraph, FIG. 4, FIG. 6, and FIG. 7)

DISCLOSURE OF THE INVENTION

The device for monitoring the rear of a vehicle disclosed in Patent Document 1 is excellent in its capability to display an image of the rear of the vehicle in a format that is readily viewed by the driver. However, in the case of a parking assistance device in which the target position is not set, the image cannot be switched according the distance from the current position of the self vehicle to the target position. In parking assistance devices in which a rough parking target, e.g., only the frame of the parking space, is set, the target position cannot be accurately defined, and the error in the distance from the current position of the self vehicle to the target position is large. Turning is involved in many parking situations, and large errors are therefore possible when calculating the distance to the target position even when the target position is defined. As a result, the image cannot be switched at the appropriate position, and visibility may be impaired.

The present application was devised in light of the aforementioned problems, and therefore it is an object thereof to provide a parking assistance device for switching between a real image and a converted image at the appropriate position and providing good visibility for the driver.

In order to achieve the aforementioned object, according to the present invention there is provided a characteristic configuration of a parking assistance device for assisting a driving operation involving turning for parking a vehicle in a desired parking position, the parking assistance device comprising an image-receiving part for acquiring image data resulting from capturing an image of a scene around the vehicle using an imaging device mounted on the vehicle; a parking-section setting part for setting a parking section corresponding to the desired parking position; an image-converting part for performing an image-converting process on the image data, the image-converting process including at least one of viewpoint conversion and distortion correction; a deflection angle calculating part for calculating a deflection angle between the vehicle and the parking section; and an image-outputting part for outputting the image data until the deflection angle is equal to or less than a reference deflection angle, and, after the deflection angle has become equal to or less than the reference deflection angle, outputting converted image data that has been subjected to the image-converting process, the image data and converted image data being outputted to a display device adapted for installation in the vehicle.

In parking involving turning, the deflection angle between the vehicle and the parking section is approximately zero at the point when parking is completed. The deflection angle is the current angle of the vehicle relative to the orientation of the vehicle once correctly settled in the parking section. In other words, the deflection angle is the angle made by the axis in the forward and backward direction of the parking section and the axis in the forward and backward direction of the vehicle. The deflection angle becoming equal to or less than the reference deflection angle therefore refers to the driving operation for parking being about to enter the final stage. In the final stage of a driving operation for parking, the scene in the vicinity of the parking section has more utility and value for the driver than the wider scene of the periphery of the vehicle. According to the present characteristic configuration, the image displayed on the display device during final stage of the driving operation for parking is switched from image data to converted image data. Converted image data is image data that has been subjected to image processing, i.e., viewpoint conversion or distortion correction. The image as a whole may contain portions that appear unnatural. However, these unnatural portions are generally on the periphery of the image. When the driving operation for parking is entering the final stage, attention is completely focused on the vicinity of the parking section in the direction of the central axis of the vehicle. The converted image data has good visibility in the central portions of the image, and therefore the image can be displayed so that visibility is improved for the driver overall. As a result, a parking assistance device for switching between a real image and a converted image at the appropriate position and providing good visibility for the driver can be provided.

Depending on the viewpoint conversion, when a "top-view" image is displayed in the final stage of the driving operation for parking, the degree to which the vehicle is parallel to the parking section can be precisely verified. There are cases where parking parallel to the parking section is not possible even when using a parking assistance device, but if a parking assistance device provided with the present characteristic configuration is employed, it is possible to readily park parallel to the parking section.

The parking assistance device according to the present invention is further characterized in that once the deflection angle has become equal to or less than the reference deflection angle, the image-outputting part outputs the converted image data regardless of the subsequent deflection angle while a state of driving assistance continues.

Depending on the driver, once the deflection angle has become equal to or less than the reference deflection angle, operations in which the deflection angle exceeds the reference deflection angle are possible, and driving operations in which the vehicle temporarily proceeds forward, and the angle is adjusted are also possible. In these instances, the image data displayed on the display device frequently switches, and visibility is in fact reduced. As mentioned above, the deflection angle becoming equal to or less than the reference deflection angle means that the driving operation for parking is in the final stage. Therefore, once the deflection angle has become equal to or less than the reference deflection angle, the converted image data is displayed on the display device regardless of the deflection angle while a state of parking assistance continues, and good visibility can be maintained.

The parking assistance device according to the present invention is also characterized in that the image-converting part performs the image-converting process so that the extent of conversion of the converted image data relative to the image data increases as the deflection angle decreases.

In cases where the difference between the image data and the converted image data is large, the driver may be made uncomfortable when the image displayed on the display device switches at the boundary of the reference deflection angle. However, when the image-outputting part described above changes the extent of conversion according to the deflection angle, the feeling of discomfort upon the switch from image data to converted image data is minimized, and visibility can be further improved.

The parking assistance device according to the present invention is also characterized in that the parking-section setting part sets the parking section on the basis of a parking standard detected on the basis of the image data, the parking standard acting as a reference while parking.

According to this configuration, the parking section is set on the basis of the image data, and therefore parking assistance can be performed without the driver actively performing the operation for setting the parking section. The parking section is set on the basis of, e.g., the frame lines of the parking space or another parking standard that serves as a reference while parking, and therefore a parking section that is properly matched to the actual parking position can be set. Methods for mechanically setting the parking section on the basis of a constant geometric positional relationship with the vehicle are known, but the error in these methods may be large. In other words, a parking section having displacement of direction and position may be set if the instructions for setting the parking section are not provided while the vehicle is in the proper orientation according to the parking assistance device. However, according to the present characteristic configuration, a parking section that is well-matched to the actual parking position can be set. As a result, convenience for the driver is enhanced, and a parking assistance device allowing good visibility can be provided.

The parking assistance device according to the present invention is also characterized in that the image-outputting part lays an extension line of the parking section over the converted image data.

Once the driving operation for parking enters the final stage, the vehicle itself is present in the parking section, and therefore the portion of the parking section contained in the image data decreases. Verifying the degree of parallel alignment with the parking section therefore becomes progressively more difficult. However, according to the configuration above, extension lines of the parking section are laid over the converted image data and displayed on the display device. Good visibility can therefore be maintained even near the completion of the driving operation.

BEST MODE FOR CARRYING OUT THE INVENTION

Figure 1:
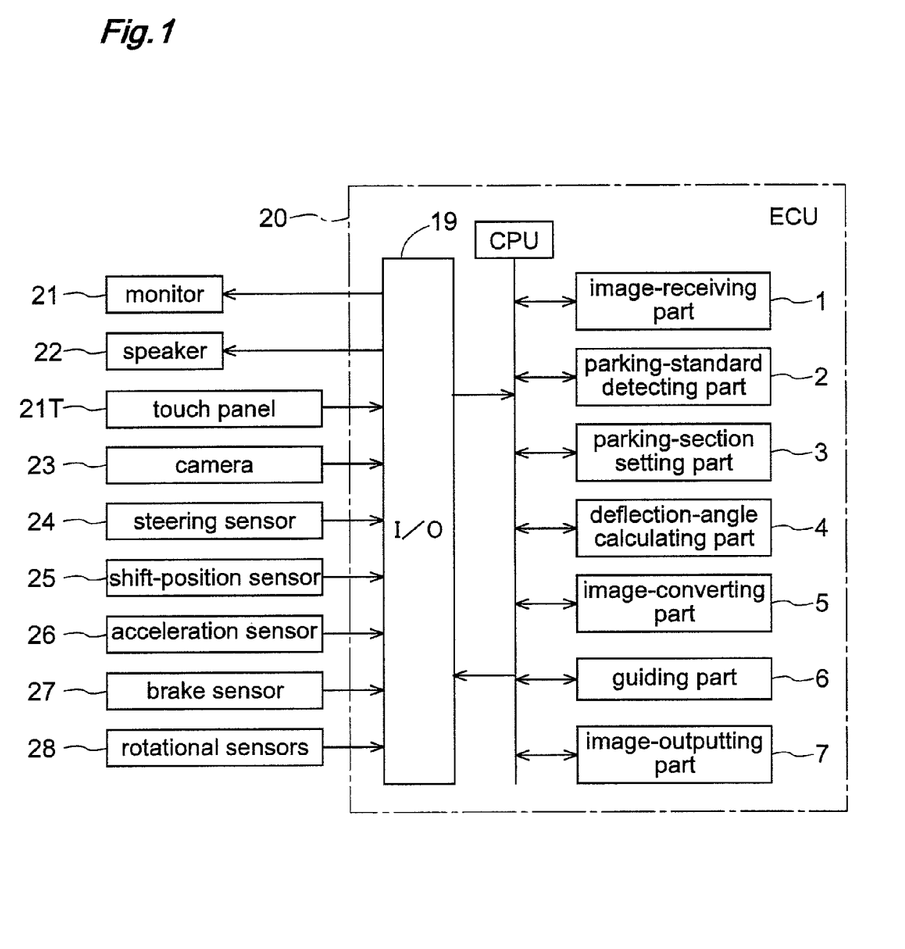
FIG. 1 is a block diagram that schematically shows a sample configuration of the parking assistance device of the present invention.
Figure 2:
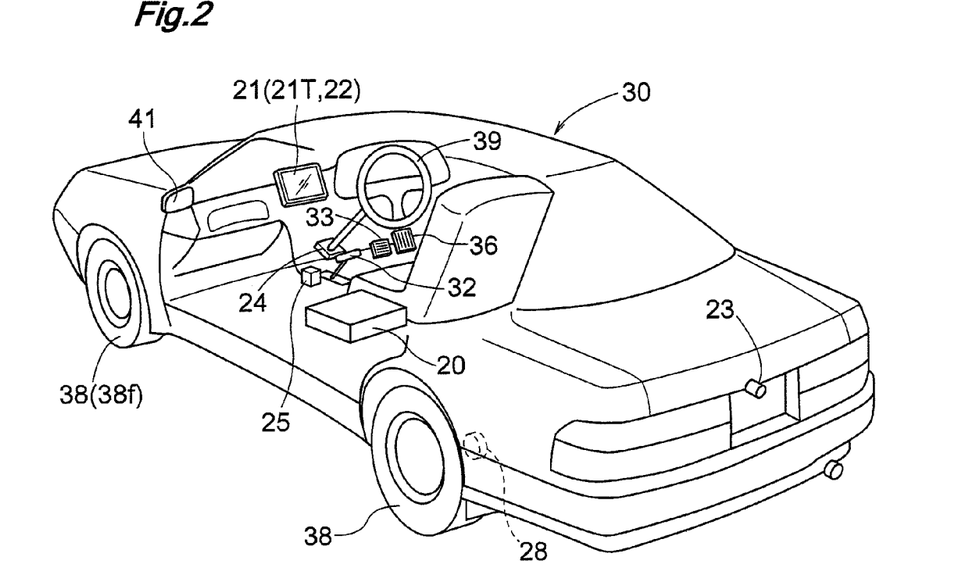
FIG. 2 is a perspective view that shows an example of a vehicle provided with the parking assistance device of the embodiment.
Figure 3:
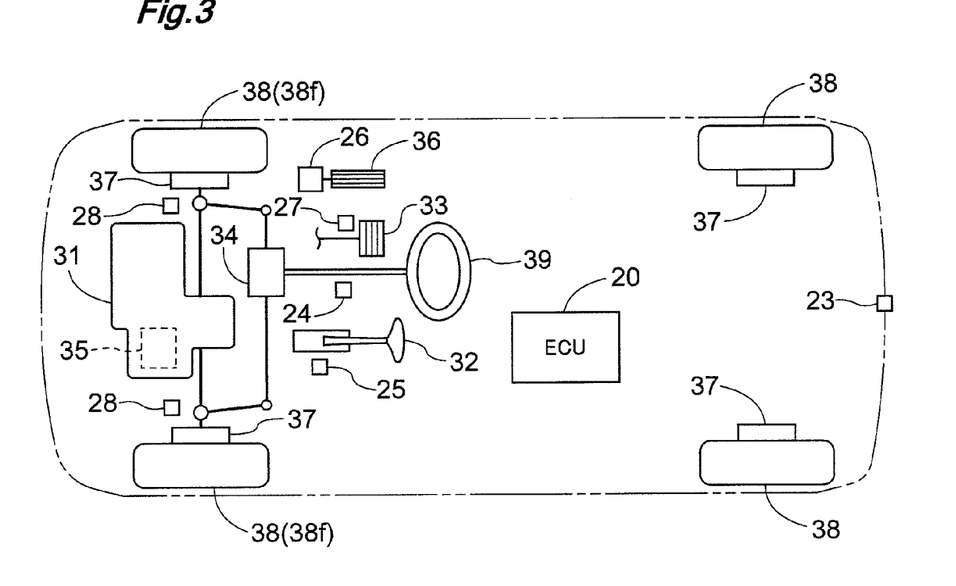
FIG. 3 is a block diagram that schematically shows an example configuration of the vehicle.

Embodiments of the present invention will be described below on the basis of the drawings. FIG. 1 is a block diagram that schematically shows an sample configuration of the parking assistance device of the present invention; FIG. 2 is a perspective view that shows an example of a vehicle 30 provided with the parking assistance device of the embodiment; and FIG. 3 is a block diagram that schematically shows an example configuration of the vehicle 30.

The parking assistance device of the present invention comprises an ECU 20 as the central core. The ECU 20 is provided with an input-output interface 19 for inputting and outputting information, and a microprocessor or DSP (digital signal processor) for processing the information obtained from the input-output interface 19. It shall be apparent that part or all of the input-output interface 19 may be contained in such a processor. The ECU 20 comprises electrical circuits for which the processor is the central core component. The ECU 20 has a storage part comprising a memory, register, or the like that is mounted within the processor or as a separate component.

A monitor 21 is provided in the vicinity of the driver's seat at an upper position on the console. A touch panel 21T is formed on the display part of the monitor as a display device. The monitor 21 is a liquid-crystal type provided with a backlight. It shall be apparent that a plasma display or CRT is also acceptable. The touch panel 21T is a pressure-sensitive or electrostatically-activated input device that can output the contact position of a finger or the like as location data. The monitor 21 is also provided with a speaker 22, but a speaker 11 may also be provided inside the door or in other locations. The monitor 21 is preferably also used as a display device for a navigation system.

A camera 23 is provided at the rear end of the vehicle 30 in the present embodiment as an imaging device for imaging the scene around the vehicle. The camera 23 is a digital camera containing a CCD (charge coupled device), CIS (CMOS image sensor), or other imaging element. The imaged information is output in real time as time-series video information. The camera 23 is a wide-angle camera, and the viewing angle is maintained between 120° to 140° in the horizontal direction. A fisheye camera having a viewing angle (field angle) of 180° or more is also acceptable. The camera 23 is installed having a depression angle of approximately 30° from the optical axis, and is capable of imaging a region extending at least to the horizon to the rear of a vehicle 30.

The camera 23 for imaging the rear of the vehicle 30 is given as an example of an imaging device in the present embodiment, but a camera may also be mounted for imaging the front of the vehicle 30, or two cameras for imaging the front and rear may be mounted.

Various sensors for detecting the driving operations and state of motion of the vehicle 30 are provided to the vehicle 30.

A steering sensor 24 is provided to the operational system of a steering wheel 39 and is capable of measuring the direction and amount of operation of the steering wheel 39. The steering wheel 39 is coupled with a power-steering unit 34 for conveying rotational operating force to front wheels 38f and assisting in steering. The direction and amount of steering of the vehicle 30 can therefore be detected on the basis of the measurement results of the steering sensor 24.

A shift-position sensor 25 is provided to the operational system of a shift lever 32 and is capable of differentiating the shift position. The shift lever 32 is coupled to a gear-shifting mechanism 35 that has a torque converter, CVT (continuously variable transmission), or the like for shifting gears and conveying motive force to vehicle wheels 38 from an engine 31 positioned in the front of the vehicle body. In the case of the present embodiment, the shift-position sensor 25 may also be configured as a switch for detecting the position in which the shift lever 32 is set.

An acceleration sensor 26 is provided to the operational system of an accelerator pedal 36 for controlling the velocity of travel. The acceleration sensor 26 is capable of measuring the amount of operation of the accelerator pedal 36. A brake sensor 27 is also provided to the operational system of a brake pedal 33 that is operated in order to bring into effect the braking force of a braking device 37 of the vehicle wheels 38. The brake sensor 27 is capable of detecting, e.g., whether or not the brake is in operation.

Rotational sensors 28 for measuring the amount of rotation of the vehicle wheels 38 are provided to at least one of the front wheels and the rear wheels as a displacement-distance sensor for the vehicle 30. It shall be apparent that the amount of displacement of the vehicle 30 can be calculated from the amount of rotation of the driving system in the gear-shifting mechanism 35.

The parking assistance device of the present invention has the functional parts shown in FIG. 1, i.e., an image-receiving part 1, a parking-standard detecting part 2, a parking-section setting part 3, a deflection angle calculating part 4, an image-converting part 5, a guiding part 6, and an image-outputting part 7. The functional parts are connected via the input-output interface 19. These connections are made via, e.g., data buses, address buses, or control buses inside or outside the microprocessor. The ECU 20, for which the microprocessor or the like serves as the central core, comprises these functional parts. The ECU 20 is provided with a memory, disk device (hard disk, optical disk, magnetic disk, magnetic optical disk, or the like), or other storage means, as described above; e.g., external or internal memory or disks are used for temporary storage of acquired image data, programs to be executed in the microprocessor, and the like. Connections such as these are well-known, and the details will be omitted from the drawings and descriptions in order to simplify the descriptions.

Figure 4:
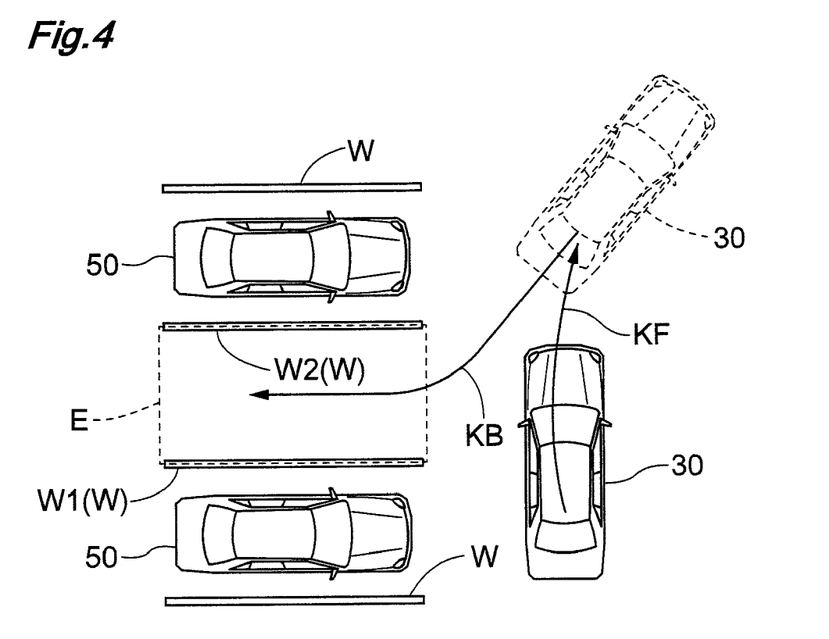
FIG. 4 is a descriptive diagram that shows an example of the operation of driving the vehicle during garage parking.

Before a general description of these functional parts is provided, a driving operation assisted by the parking assistance device of the present invention will be described. The parking assistance device of the present invention functions to assist a driving operation involving turning for parking a vehicle in a desired parking position. This driving operation corresponds to, e.g., garage parking, as shown in FIG. 4. When parking in a garage, the vehicle 30 proceeds forward (forward route KF) to a switch-back position while turning in a first turning direction. From the switch-back position, the vehicle proceeds backward (backward route KB) while turning in a second turning direction, which is opposite from the first turning direction. In, e.g., the example shown in FIG. 4, garage parking is performed using an empty parking section E between other previously parked vehicles 50 as the desired parking position. The other vehicles 50 are shown in this example in order to clearly show the desired parking position, but it shall be apparent that the other vehicles 50 need not be present. The parking section E in FIG. 4 is prescribed by compartment lines W (parking section lines) on the roadway surface.

Figure 5:
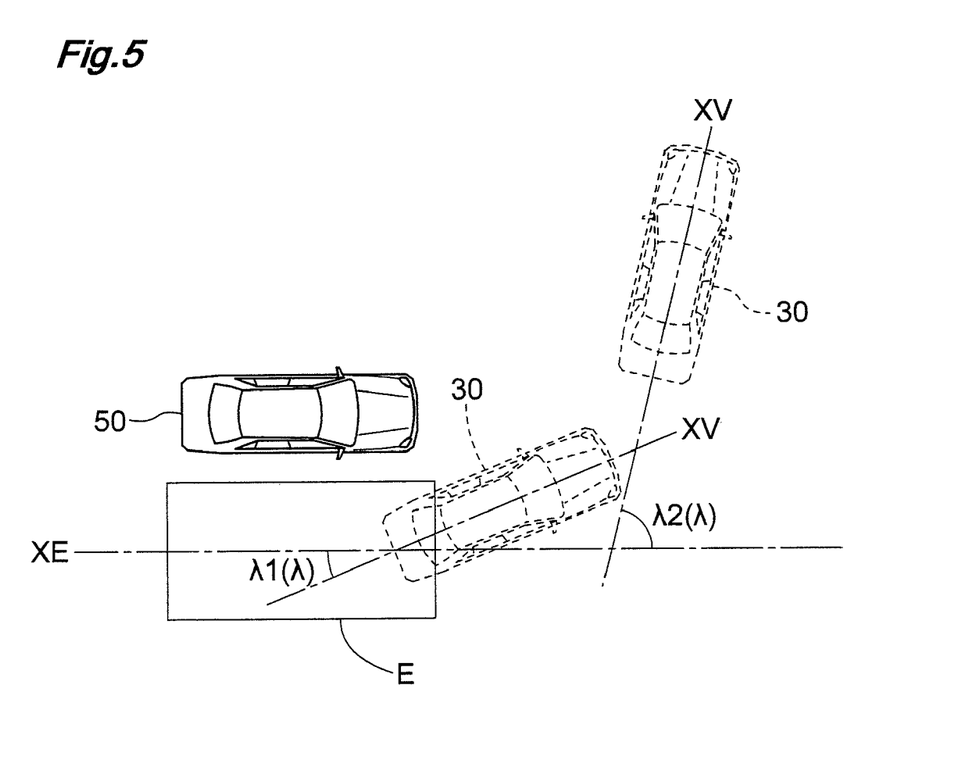
FIG. 5 is a descriptive diagram that shows the deflection angle between the parking section and the vehicle.

FIG. 5 is a descriptive diagram that shows a deflection angle λ between the parking section E and the vehicle 30. The vehicle 30 at the switch-back position and the vehicle 30 after commencing backward movement are shown by dotted lines in FIG. 5. The deflection angle λ is the angle of the vehicle 30 relative to the orientation of the vehicle 30 when properly settled in the parking section E. In other words, the deflection angle λ is the angle formed by an axis XE in the forward and backward direction of the parking section E and an axis XV in the forward and backward direction of the vehicle 30. A deflection angle λ2 at the switch-back position is larger than a deflection angle λ1 after commencing backward motion while turning, as shown in FIG. 5. Ideally, the deflection angle λ is at a maximum at the switch-back position, gradually decreases during the transition from the switch-back to the completion of parking, and reaches approximately zero upon the completion of parking. The parking assistance device of the present invention switches the image displayed on the display part of the monitor 21 on the basis of this deflection angle λ, as described hereinafter.

General descriptions of the aforementioned functional parts will be given below.

The image-receiving part 1 functions to acquire image data resulting from imaging the scene around the vehicle 30 using the camera 23 (imaging device) mounted on the vehicle 30.

The parking-standard detecting part 2 functions to detect the parking standard (e.g., the compartment lines W) on the basis of the acquired image data when parking the vehicle 30.

The parking-section setting part 3 functions to set the parking section E corresponding to the desired parking position on the basis of the detected compartment lines W (parking standard).

The deflection angle calculating part 4 functions to calculate the deflection angle λ between the vehicle 30 and the parking section E.

The image-converting part 5 functions to perform image-conversion processing, which includes at least one of viewpoint conversion and distortion correction, on the image data.

The guiding part 6 functions to calculate the amount of steering and the amount of displacement of the vehicle 30 when moving backwards from the switch-back position on the backward route KB, and assists and guides driving operations related to parking. The guiding part 6 also functions to generate various guidelines that can be shown using the image-outputting part 7.

The image-outputting part 7 functions to output to the display part of the monitor 21 at least one of the image data imaged by the camera 23 and the converted image produced by the image-converting part 5. When various guidelines and the like are generated, those guidelines are superimposed on the image data and the converted image data and outputted.

The details of the specific processes for parking assistance that are executed by the aforedescribed functional parts will be described next. The operation of the parking assistance device of the present invention will also be described below using the flow chart shown in FIG. 6 and the example screens of the display part shown in FIGS. 7 through 11. The example that will be described is that of parking in a garage, in which the vehicle 30 is to be positioned in the empty parking section E as shown in FIG. 4.

The driver inputs directions for commencing parking-assistance control using a switch (not shown), the touch panel 21T, or the like in the vehicle cabin. The input from the switch or the touch panel 21T that functions as the input part is transmitted to the ECU 20 via the input-output interface 19, and the ECU 20 commences the execution of parking assistance functions. Specifically, the execution of parking assistance functions is commenced by the functional parts of the ECU 20 (#1 in FIG. 6).

Garage parking is given as an example in the present embodiment, but when parking assistance functions are applied to a plurality of parking formats, a designation of the parking format is also included in the commencement instructions. Parking formats to be designated include, e.g., garage parking, parallel parking, and parking to either the left or right side. The parking format need not be designated when the parking assistance device is capable of automatically determining the parking format on the basis of the behavior of the vehicle 30. The behavior referred to here is, e.g., the steering direction and steering angle of the steering wheel 39 detected by the steering sensor 24; e.g., if the steering angle reaches or exceeds a predetermined angle within a predetermined time interval after the commencement of parking assistance control, garage parking is determined, and if the steering angle is less than the predetermined angle (including forward motion), parallel parking is determined.

The image-receiving part 1 acquires image data resulting from imaging the scene around the vehicle 30 using the camera 23 mounted on the vehicle 30. The image-receiving part 1 performs synchronizing separation and A/D conversion on the image signal output from the camera 23 and receives image data at, e.g., 30 frames per second. It shall be apparent that, e.g., 15 or 60 frames may be acquired per second, or the predetermined interval of the image data to be chronologically acquired may be changed according to the image processing capacity of the parking-standard detecting part 2 and the like. The acquired image data is accumulated in the frame memory (not shown) of the ECU 20 and read and used as appropriate; e.g., the image-outputting part 7 outputs the image data to the display part after adjusting the number of pixels and the like to match the display of the display part. The picture imaged by the camera 23 is displayed on the display part of the monitor 21 (#2 in FIG. 6). The image data from the camera 23 may also be acquired by digital transmission.

Figure 6:
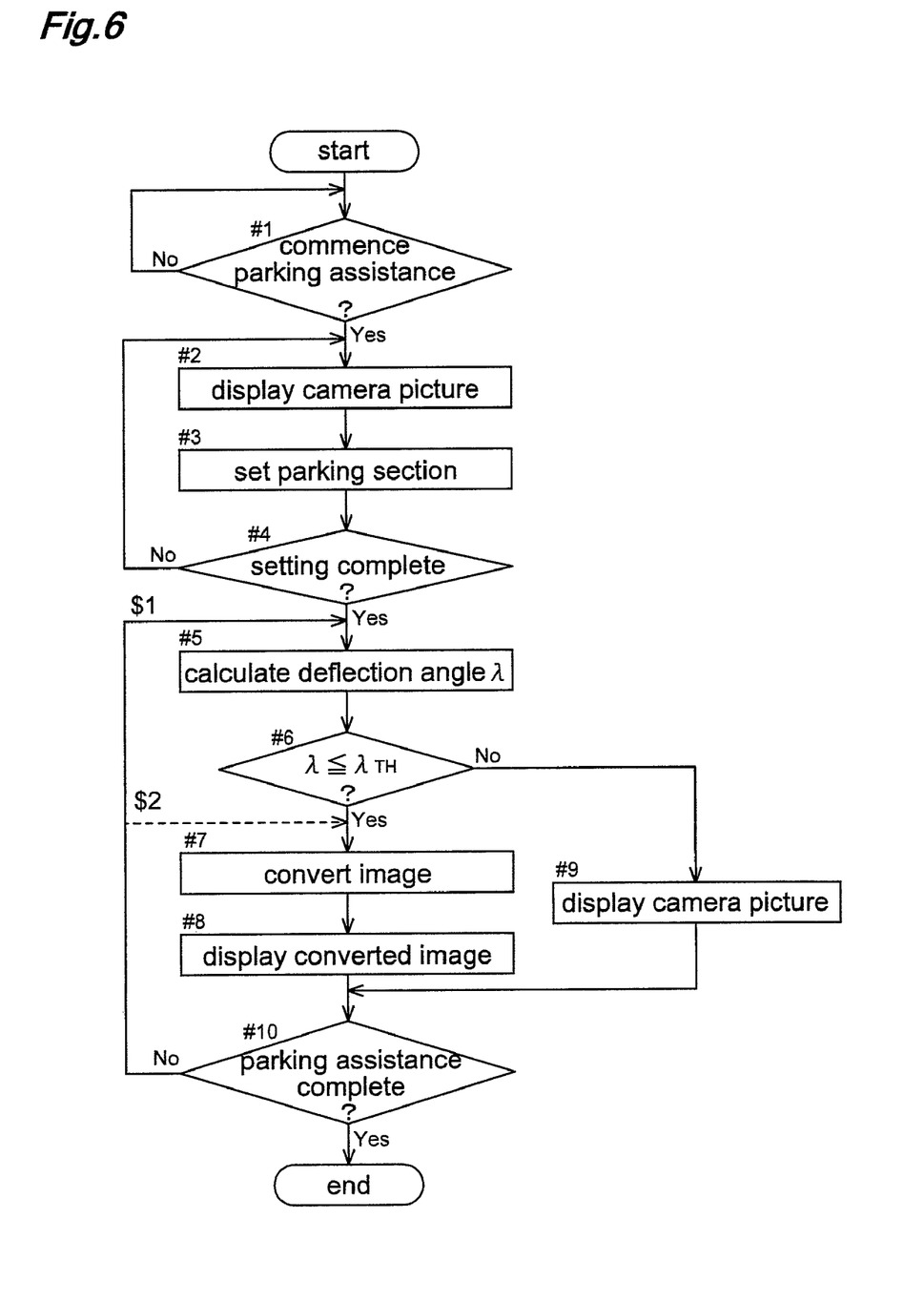
FIG. 6 is a flow chart that shows the operation of the parking assistance device of the present invention.
Figure 7:
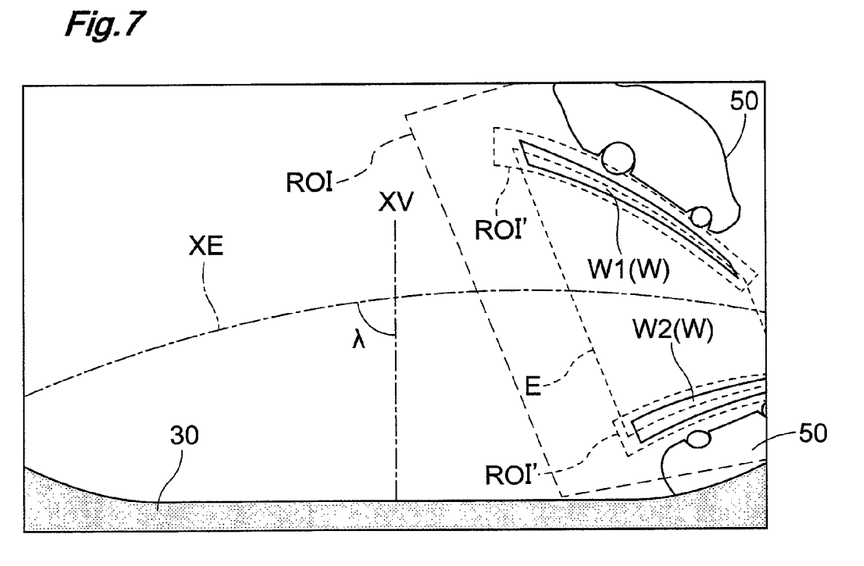
FIG. 7 is a descriptive diagram that shows an example in which the image data is displayed on the display device, and that shows an example of a method for setting the parking section on the basis of the image data.
Figure 8:
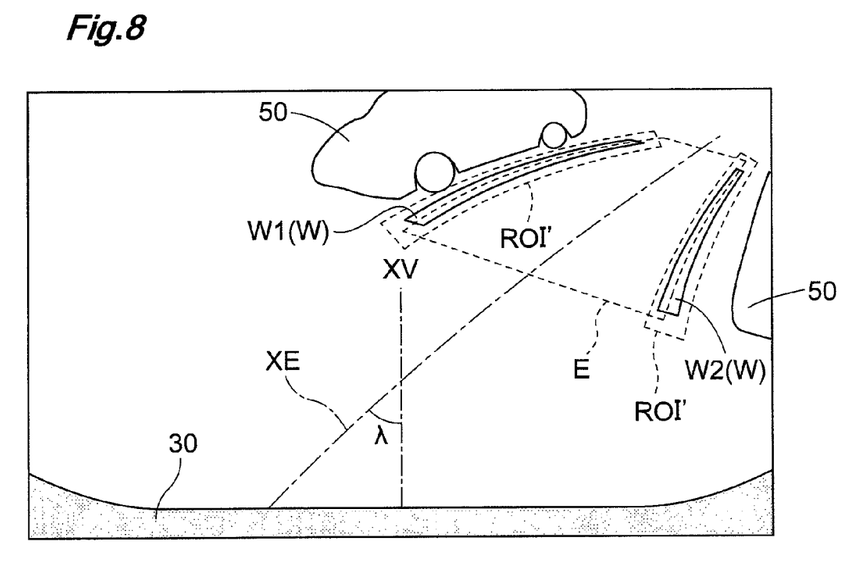
FIG. 8 is a descriptive diagram that shows an example in which the image data is displayed on the display device.

The process for setting the parking section E using the image data is then executed (#3 in FIG. 6). FIG. 7 shows an example in which the image data from the camera 23 is displayed on the monitor 21 when, e.g., the vehicle 30 is in the switch-back position shown in FIG. 5. The broken line and the alternatingly dotted line in FIG. 5 are not displayed on the monitor 21 but represent hypothetical lines for purposes of description.

The compartment lines W are included in the image data, as shown in FIG. 7. The parking-standard detecting part 2 detects the compartment lines W that act as the parking standard on the basis of the image data. The size of the area sectioned off by the compartment lines W is standardized and is therefore constant within an approximate range. The desired parking position also remains within a roughly constant range according to the parking format. The range in which the compartment lines W are presumed to fall is accordingly set as a target region ROI, and an image recognition process is executed in order to lighten the computational load. The ground is generally asphalt paving or the like and has a dark color during such parking, and the compartment lines W are white, yellow, or another light color. The compartment lines W are therefore appropriately detected by edge detection, Hough transformation, or other well-known image-processing methods.

Once the compartment lines W (W1, W2) are detected, the parking-section setting part 3 recognizes and sets the parking section E on the basis of the compartment lines W. When the compartment lines W is not properly detected, or the parking section E cannot be recognized, the process for setting the parking section E is repeatedly executed on the basis of the sequentially acquired image data. After the parking section E has been set, the target region ROI is further narrowed (ROI'), whereby the computational load resulting from the detection of the compartment lines W and the process for recognizing the parking section E can be reduced further. The vehicle 30 moves in order to park, but the trajectory of the vehicle 30 is calculated in the guiding part 6 using input from the rotational sensors 28 and other sensors (e.g., numbers 24 through 28 in FIGS. 1 through 3). Though omitted from the flow chart FIG. 6, the parking-section setting part 3 cooperates with the guiding part 6 and the like and tracks the parking section E according to the displacement of the vehicle 30 even after the parking section E has been set (see, e.g., FIGS. 8, 9). The parking section E may also be set manually by the driver using a touch panel 21T or other input means.

Once the parking section E is set, the axis XE in the forward and backward direction of the parking section E can be obtained. The axis XV in the forward and backward direction of the vehicle 30 is constant within the image data. The deflection angle calculating part 4 calculates the deflection angle λ, which is the angle made between the axis XV of the vehicle 30 and the axis XE obtained for the parking section E, on the basis of these axes (#5 in FIG. 6). The parking section E is also tracked and set according to the displacement of the vehicle 30, as mentioned above. The axis XE of the parking section E is therefore also updated as necessary while the vehicle 30 proceeds backwards from the switch-back position while turning, and the deflection angle λ is also updated, as shown in, e.g., FIG. 8. The deflection angle λ may also be calculated from the displacement distance and steering angle of the vehicle or may be calculated by an angular velocity sensor instead of from the image data.

The image-outputting part 7 outputs to the display part of the monitor 21 at least one of the image data and the converted image data on the basis of the deflection angle λ. The converted image data will be described hereinafter. The image data is output to the display part when the deflection angle λ is not obtained, as described above (#2 in FIG. 6). The image data is, also output to the display part when the deflection angle λ is larger than a predetermined reference deflection angle $λ_{TH}$ (#6 and #9 in FIG. 6). When the deflection angle λ becomes equal to or less than the reference deflection angle $λ_{TH}$, the image-outputting part 7 outputs the converted image data, which is converted by the image-converting part 5, to the display part (#8 in FIG. 6).

Figure 9:
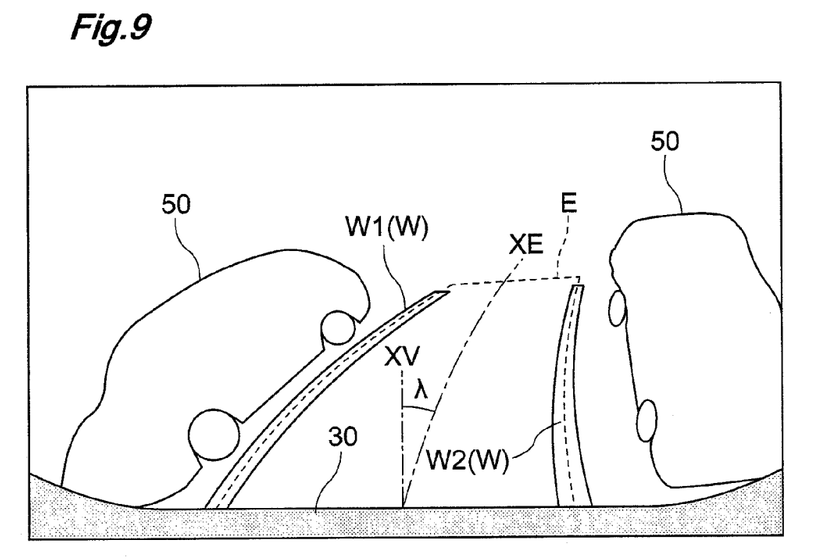
FIG. 9 is a descriptive diagram that shows an example display of the image data when switching from image data to converted image data.
Figure 10:
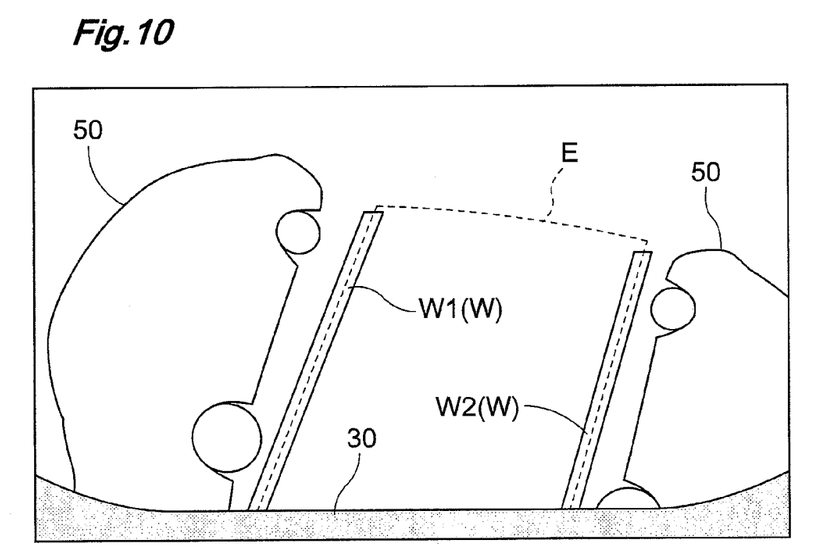
FIG. 10 is a descriptive diagram that shows an example display of the converted image data when switching from image data to converted image data.

The example screens of the display part of the monitor 21 shown in FIGS. 9 and 10 are before and after, respectively, the image-outputting part 7 switches the output image. In FIG. 9, when the deflection angle λ reaches the reference deflection angle $λ_{TH}$, the image-outputting part 7 outputs converted image data to the display part as shown in the example of FIG. 10 instead of image data. The converted image data in the present example is viewpoint-converted image data in which the position of the camera 23 has shifted from a low position to a high virtual position. FIG. 10 gives an example of a so-called top-view viewpoint-converted image in which the optical axis of the camera 23 is substantially perpendicular to the ground. The viewpoint-converted image data is generated by performing an image-converting process on the image data in the image-converting part 5 (#7 in FIG. 6). As opposed to the angled-view image of the low viewpoint shown in FIG. 9, the high viewpoint shown in FIG. 10 is an high viewpoint plan image. The driver can therefore easily ascertain, e.g., the angle (deflection angle λ) of the vehicle 30 relative to the parking section E and the position (depth of entry) of the vehicle 30 in the parking section E.

The deflection angle λ is then calculated according to the displacement of the vehicle 30 as described above, a determination of the value of the deflection angle λ with respect to the reference deflection angle $λ_{TH}$ is made, and the image data displayed on the monitor 21 is switched. In other words, the loop passing through $1 shown in FIG. 6 continues until parking assistance control is completed. The completion of parking assistance control may be indicated by the driver via the touch panel 21T or the like, or the ECU 20 may automatically recognize completion. Completion of parking assistance control can be recognized when, e.g., the shift-position sensor 25 detects that the shift lever 32 has changing from the reverse position to the parking position.

The reference deflection angle $λ_{TH}$ is set as the deflection angle λ considered to allow parking to be substantially completed if a typical driving operation continues. The converted image data is therefore displayed on the monitor 21 until the completion of parking assistance control, even if the step for determining the deflection angle (#6) is passed through a plurality of times. However, depending on the driver, operations in which the deflection angle λ exceeds the reference deflection angle $λ_{TH}$ are possible, and driving operations in which the vehicle 30 temporarily proceeds forward, and the angle is adjusted are also possible. In these instances, the image data displayed on the monitor 21 frequently switches, and visibility is in fact reduced. Accordingly, the loop passing through $2 may be continued until parking assistance control is completed, as shown by the dotted line in FIG. 6. This loop does not pass through the step for determining the deflection angle (#6). Therefore, once the deflection angle λ has become equal to or less than the reference deflection angle $λ_{TH}$, the image-outputting part 7 outputs the converted image data regardless of the deflection angle λ while a state of driving assistance continues. It shall be apparent that the flow chart may also be altered so that once the deflection angle λ is calculated, only the determination of the deflection angle is not performed.

A variety of conditions for the completion of parking assistance control can be set other than the shift lever 32 being changed from the reverse position to the parking position, as mentioned above. Parking assistance control is also known to end when, e.g., the shift lever 32 is changed from the reverse position to the forward position, neutral position, or another position. When completion is determined in this manner, parking assistance control itself ends when the driver tries to move forward slightly and adjust the parking position, which is not preferable. Therefore, once the ending conditions have been arranged, reconfirmation is performed at a predetermined time, and parking assistance may be ended when ending conditions have been met at that point in time.

Figure 11:
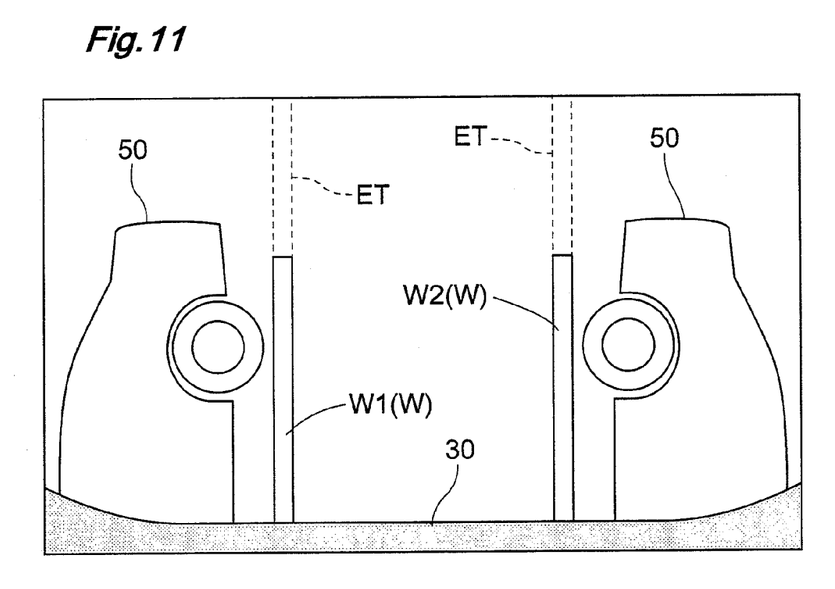
FIG. 11 is a descriptive diagram that shows an example in which extension lines of the parking section are superimposed and displayed on the converted image data.

FIG. 11 is an example screen of the monitor 21 when the vehicle 30 has turned until the deflection angle λ has reached approximately zero, and the vehicle proceeds straight backward to the optimal parking position. As is clear from FIG. 11, the compartment lines W are only present in part of the screen, and therefore the position while proceeding backward may be difficult for the driver to ascertain. Accordingly, the image-outputting part 7 lays extension lines of the parking section E over the converted image data, as shown in FIG. 11. In the present example, extension lines ET of the compartment lines W are laid over the image. The compartment lines W are detected by the parking-standard detecting part 2, and therefore the extension lines ET are particularly easily provided in the present example.

Figure 12:
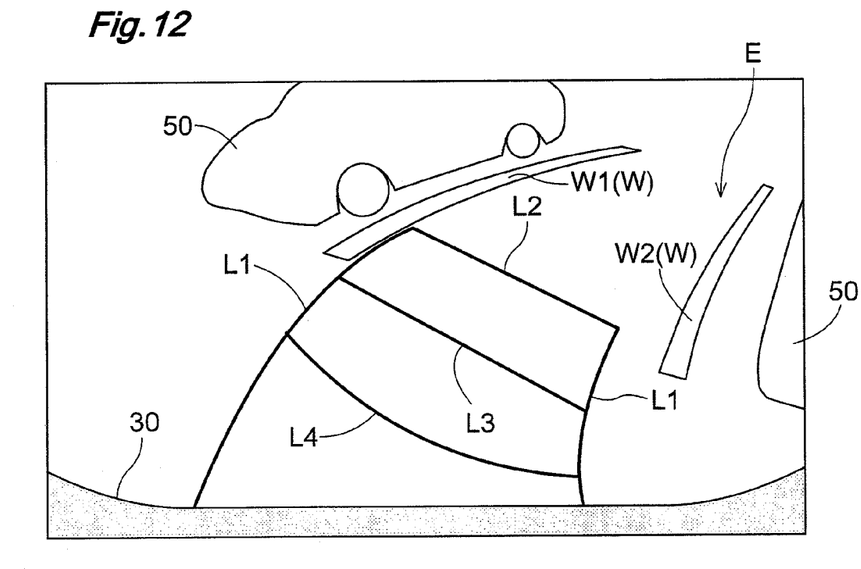
FIG. 12 is a descriptive diagram that shows an example in which guidelines are superimposed and displayed on the image data.

The image-outputting part 7 may also lay guidelines onto the image data or the converted image data and output these guidelines to the monitor 21, as shown in FIG. 12. FIG. 12 shows an example of a monitor screen having superimposed guidelines. In the present example, guidelines L1 are extension lines of the width of the vehicle and are displayed in green. A guideline L2 is an indicator line 5 m to the rear and is shown in green. A guideline L3 is an indicator line 3 m to the rear and is shown in green. A guideline L4 is a warning line 1 m to the rear and is shown in red. The driver can perform driving operations with reference to these guidelines. Though omitted from the drawings, overlaid guidelines can similarly be provided when the image displayed on the monitor 21 changes to converted image data, whereby the convenience of the parking assistance device can be further enhanced.

The image-converting part 5 performs viewpoint-conversion processing on the image data and thereby generates so-called top-view converted image data. However, the image data to be converted is imaged from a low viewpoint (the installation position of the camera 23), and therefore it shall be apparent that the viewpoint is converted as if everything is flat, i.e., present on the road surface. The image is therefore such that, e.g., the parked vehicles 50 adjoining the parking section E appear overturned, as shown in FIG. 11. However, the important point of this screen is the relationship between the parking section E and the vehicle 30, and the view on the screen is therefore of sufficient practical utility.

Other Embodiments

An embodiment of the parking assistance device according to the present invention was described above as an example of parking assistance for parking in a garage. The aforedescribed embodiment is an example, and a person of ordinary skill in the art could make various modifications within a scope that does not deviate from the intent of the present invention, such modifications also being included in the purview of the present invention. Examples of alternate embodiments of the present invention will be introduced below.

(1)

Figure 13:
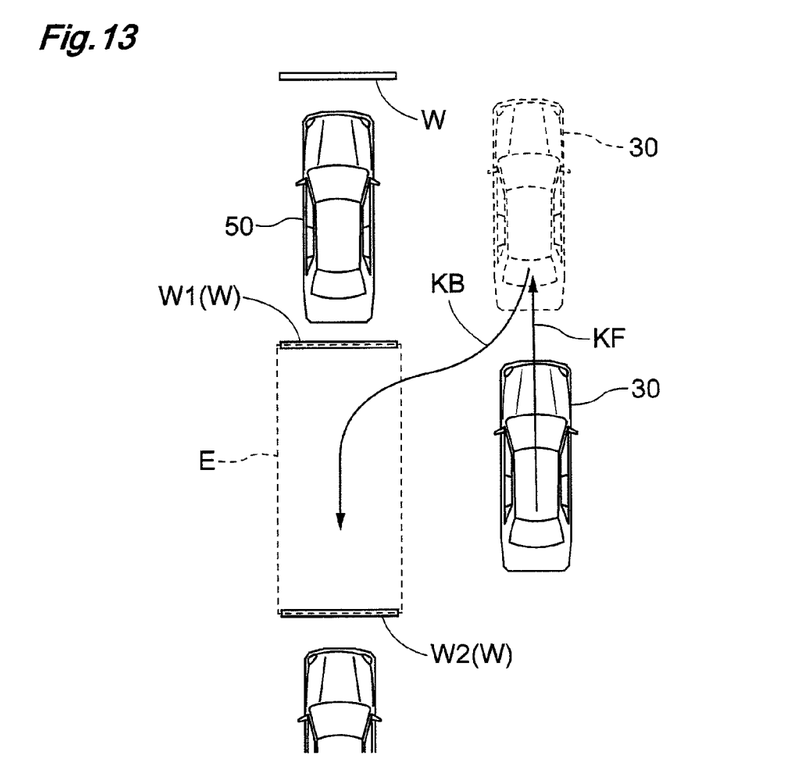
FIG. 13 is a descriptive diagram that shows an example of the driving operation of a vehicle during parallel parking.

The present invention is not limited to garage parking and can also be applied to parallel parking as shown in FIG. 13. In the case of parallel parking, as well, parking is ultimately complete when the deflection angle λ relative to the parking section E reaches approximately zero. Visibility can therefore be improved for the driver when the image displayed on the monitor 21 is made to change on the basis of the deflection angle λ as described above. The size of the turning angle during parking is different in parallel parking than in garage parking. The reference deflection angle $\lambda_{TH}$ therefore preferably has a different value depending on the parking format.

(2)

The image-converting part 5 may also cause the height of the converted viewpoint to change according to the deflection angle λ. In other words, the image-converting process may also be performed while the extent of conversion of the converted image data is changed according to the deflection angle λ. In the example described above using FIGS. 9 and 10, the reference deflection angle $\lambda_{TH}$ acts as a boundary for switching between image data and top-view converted image data. The viewpoint conversion represented by the solid line in FIG. 14 demonstrates the relationship between the deflection angle λ and the height of the viewpoint. In other words, the image data of the camera 23 installed having a depression angle of 30°; i.e., of the camera 23 having an optical axis of 30° relative to the road surface, is displayed until a reference deflection angle $\lambda_{TH1}$ ($\lambda_{TH}$) is reached. Converted image data of a virtual camera 23V having an optical axis of 90° relative to the road surface is then displayed, where the reference deflection angle $\lambda_{TH1}$ acts as a boundary.

Figure 14:
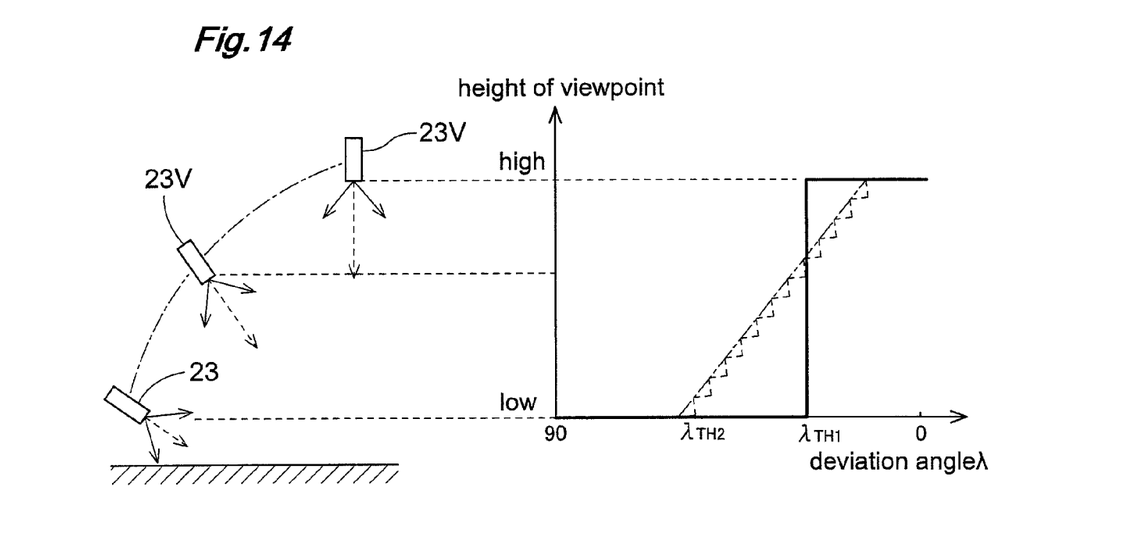
FIG. 14 is a graph that schematically shows an example of the relationship between the deflection angle $\lambda$ and the height of the viewpoint of the displayed image.

However, this example is not given by way of limitation. The image-converting part 5 may also generate converted image data while the viewpoint is continuously or intermittently changed from low to high according to the deflection angle λ. The alternatingly dotted line in FIG. 14 is an example of a case in which the converted image data is generated while the viewpoint is continuously changed from low to high according to the deflection angle λ. The broken line in FIG. 14 is an example of a case in which the converted image data is generated while the viewpoint intermittently changes from low to high according to the deflection angle λ. In either case, time is required for the viewpoint of the converted image data to reach 90°; i.e., to reach the top view. A reference deflection angle $\lambda_{TH2}$ ($\lambda_{TH}$) is therefore preferably larger than the reference deflection angle $\lambda_{TH1}$ of the aforedescribed embodiment. The value set as the reference deflection angle $\lambda_{TH2}$ can be the maximum value (e.g., 90° in FIG. 14) in the case of the largest angle.

(3)

Figure 15:
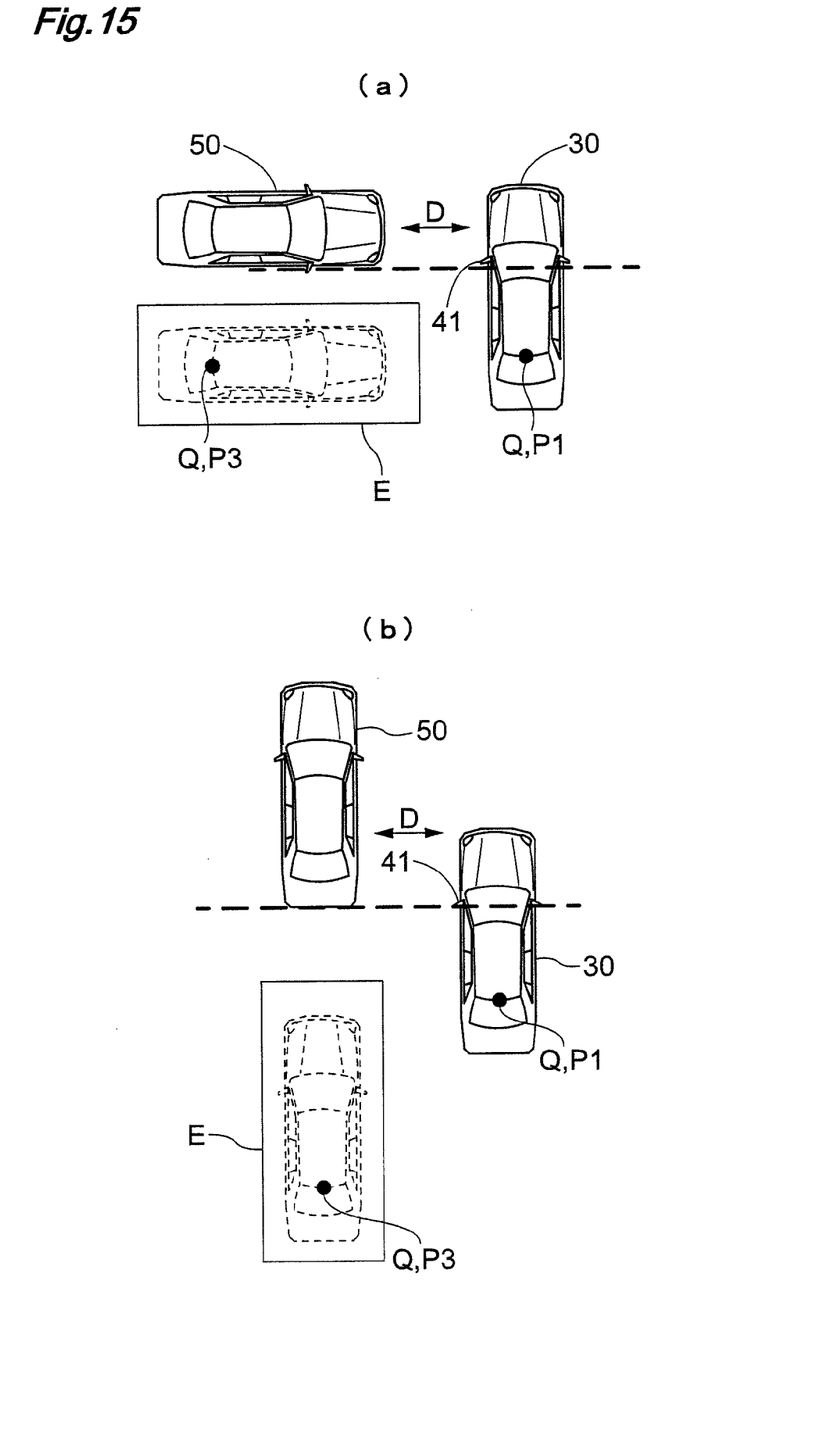
FIG. 15 is a descriptive diagram that shows another example for setting the parking section.

An example was given in the aforedescribed embodiment in which the parking-section setting part 3 sets the parking section E on the basis of the parking standard (compartment lines W) detected on the basis of the image data. However, this example is not given by way of limitation, and the parking section E may be set using other methods. FIG. 15 is a descriptive diagram that shows another embodiment for setting the parking section E.

The driver stops the vehicle 30 at a predetermined stopping position relative to the desired parking position. Instructions to commence parking assistance are then provided to the ECU 20 via the touch panel 21T or other input means at this predetermined stopping position. Specifically, the vehicle 30 is stopped at a position such that a door mirror 41 of the vehicle 30 and an end part of the predetermined parking position form a straight line in the lateral direction of the vehicle 30 when the vehicle is parked in a garage, as shown in FIG. 15(a). The vehicle 30 is stopped at a position such that the door mirror 41 of the vehicle 30 and an end part of the predetermined parking position form a straight line in the lateral direction of the vehicle 30 when parallel parking, as shown in FIG. 15(b). The vehicle 30 in these instances is stopped at a position removed from the predetermined parking position by an approximate distance D in the lateral direction of the vehicle 30. If the parking format is considered, the relationship between the desired parking position and the vehicle 30 is arranged on a two-dimensional coordinate grid where the vehicle 30 is assumed to exist on a flat surface. The parking-section setting part 3 can therefore set the parking section E.

The instructions to commence parking assistance are implemented at the predetermined stopping position, as described above. The parking-section setting part 3 can therefore set the parking section, where the coordinate reference of the vehicle 30 is Q. In the case of garage parking, as shown in FIG. 15(a), the parking-section setting part 3 calculates the geometric relationship between a coordinate P1 of the vehicle 30 at the predetermined stopping position and a coordinate P3 of the vehicle 30 when parked in the parking section E, and sets the parking section E. The case of parallel parking is similar. The parking-section setting part 3 sets the parking section E on the basis of the geometric relationship between the coordinate P1 and the coordinate P3, as shown in FIG. 15(b).

(4)

An example was given in the aforedescribed embodiment in which viewpoint conversion was performed for the image-converting process. However, this example is not given by way of limitation, and distortion-correction processing may also be implemented. Images taken using a wide-angle lens have peripheral distortions. However, the advantages of a wide-angle image are lessened when distortions are over-corrected, and visibility may in fact be reduced. However, as parking approaches completion, the attention of the driver is entirely focused on the area around the parking section E, and the necessity of a wide-angle image therefore diminishes. At the point when parking finishes, the vehicle 30 is reversing substantially straight, and therefore visibility is better when using an image having low distortion. Distortion correction is therefore preferably more prominent when the deflection angle λ is equal to or less than the reference deflection angle $\lambda_{TH}$.

(5)

An example was given in the aforedescribed embodiment in which the image displayed on the display device was switched from image data to converted image data. However, this example is not given by way of limitation, and both image data and converted image data may be displayed. In other words, image data alone may be output to the display device until the deflection angle λ becomes equal to or less than the reference deflection angle $\lambda_{TH}$. Once the deflection angle λ has become equal to or less than the reference deflection angle $\lambda_{TH}$, converted image data and image data may be output. When outputting converted image data and image data, an image format can be adopted as follows; e.g., a two-screen display can be used in the display device, where the image data is displayed in a small screen frame, and the converted image data is displayed in a large screen frame. Another screen frame may also be provided within the image data to display the converted image data. In other words, a so-called picture-in-picture display may be used.

According to the present invention as described above, a parking assistance device for switching between a real image and a converted image at the appropriate position and providing good visibility for the driver can be provided.

INDUSTRIAL APPLICABILITY

The present invention can be employed as a parking assistance device for assisting driving operations while parking a vehicle.

The invention claimed is:

1. A parking assistance device for assisting a driving operation involving turning for parking a vehicle in a desired parking position, the parking assistance device comprising:
   an image-receiving part for acquiring image data resulting from capturing an image of a scene around the vehicle using an imaging device mounted on the vehicle;
   a parking-section setting part for setting a parking section corresponding to the desired parking position;
   an image-converting part for performing an image-converting process on the image data, the image-converting process including at least one of viewpoint conversion and distortion correction;
   a deflection angle calculating part for calculating a deflection angle between the vehicle and the parking section; and
   an image-outputting part for outputting the image data when the deflection angle is determined to be larger than a reference deflection angle while the vehicle is moving rearward during reverse parking, and, after the deflection angle is determined to be equal to or less than the reference deflection angle while the vehicle is moving rearward during the reverse parking, outputting converted image data that has been subjected to the image-converting process in accordance with the deflection angle determination, the image data and converted image data being outputted to a display device adapted for installation in the vehicle.

2. The parking assistance device according to claim 1, wherein, once the deflection angle has become equal to or less than the reference deflection angle, the image-outputting part outputs the converted image data regardless of the subsequent deflection angle while a state of driving assistance continues.

3. The parking assistance device according to claim 1, wherein the image-converting part performs the image-converting process so that the extent of conversion of the converted image data relative to the image data increases as the deflection angle decreases.

4. The parking assistance device according to claim 1, wherein the parking-section setting part sets the parking section on the basis of a parking standard detected on the basis of the image data, the parking standard acting as a reference while parking.

5. The parking assistance device according to claim 1, wherein the image-outputting part lays an extension line of the parking section over the converted image data.

6. The parking assistance device according to claim 2, wherein the image-converting part performs the image-converting process so that the extent of conversion of the converted image data relative to the image data increases as the deflection angle decreases.

7. The parking assistance device according to claim 2, wherein the parking-section setting part sets the parking section on the basis of a parking standard detected on the basis of the image data, the parking standard acting as a reference while parking.

8. The parking assistance device according to claim 3, wherein the parking-section setting part sets the parking section on the basis of a parking standard detected on the basis of the image data, the parking standard acting as a reference while parking.

9. The parking assistance device according to claim 2, wherein the image-outputting part lays an extension line of the parking section over the converted image data.

10. The parking assistance device according to claim 3, wherein the image-outputting part lays an extension line of the parking section over the converted image data.

11. The parking assistance device according to claim 4, wherein the image-outputting part lays an extension line of the parking section over the converted image data.

12. The parking assistance device according to claim 1, wherein the a parking-section setting part sets a parking section corresponding to the desired parking position based on detected compartment lines.

* * * * *